UNITED STATES PATENT OFFICE.

ANSON GARDNER BETTS, OF TROY, NEW YORK.

PROCESS OF TREATING THE METAL MIXTURES PRODUCED AS A BY-PRODUCT IN ELECTROLYTIC METAL-REFINING.

SPECIFICATION forming part of Letters Patent No. 793,039, dated June 20, 1905.

Application filed May 20, 1904. Serial No. 208,945.

*To all whom it may concern:*

Be it known that I, ANSON GARDNER BETTS, a citizen of the United States, residing at Troy, county of Rensselaer, and State of New York, have invented certain new and useful Improvements in Processes of Treating the Metal Mixtures Produced as By-Products in Electrolytic Metal-Refining Operations, of which the following is a specification.

This invention relates to improvements in processes of treating the product known as "anode slime," which usually contains in a finely-divided condition free or combined lead, copper, arsenic, antimony, silver, and gold, with less important quantities of other elements.

The object of my invention is to reduce the costs and losses attending the treatment of this material by known methods. Refining these materials by fusion methods is necessarily wasteful on account of the volatility of some of the components and its fine character, which occasion loss by volatilization and dusting. I therefore adopt a process of purification by solution of some of the metals. For solution it is necessary to convert the metals into soluble compounds, which is accomplished by oxidation, and this requires a considerable quantity of oxidizing compounds, and acids or bases to take the oxidized metallic compounds into solution.

According to my present process I regenerate the oxidizing compound used for oxidation from its products of reduction, which oxidizing compound is so chosen that none of its components are lost as gases when it reacts with the metals of the slime. I prefer to accomplish this regeneration in a separate operation from the operation of oxidizing and dissolving metals of the slime.

I especially prefer to use an acid to take the oxidized metals into solution and subsequently to remove some of the metals from the solution by precipitation with other metal and finally by electrolysis to remove the precipitating metal.

The oxygen produced at the anode while the metal is being deposited at the cathode I absorb to reform the oxidizing agent, so that in its preferred form my process regenerates both the solvent and the oxidizing agent.

I prefer to conduct my process as follows as applied to the treatment of slime from electrolytic lead-refining, which consists mostly of metallic lead, copper, arsenic, antimony, and silver. I can treat slime from electrolytic copper-refining in the same way; but as the treatment of the lead slime is more difficult and complicated I will describe the treatment of the latter.

The slime is agitated in a suitable tank, which may be lined with lead, with a hot solution of ferric sulfate containing, say, two per cent. of free sulfuric acid and four per cent. of iron as ferric sulfate. The presence of some cupric sulfate, ferrous sulfate, arsenious acid, and antimony compounds in the solution is usual, but they take no active part in attacking the slime. Enough ferric sulfate is present to carry out these reactions, and an excess is an advantage.

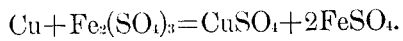

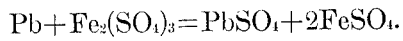

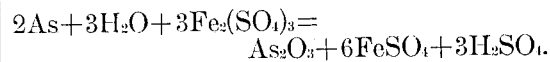

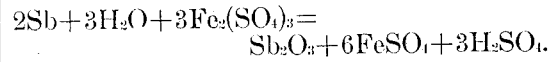

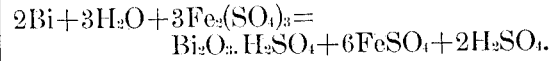

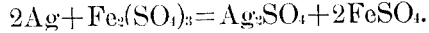

After agitation and action for some time the mixture is allowed to settle and the solution drawn off. The residue is washed by decantation with hot water, the wash-water being first brought into contact with metallic copper to precipitate silver and then into contact with scrap-iron to precipitate copper, after which it is run to waste, as it contains only a small amount of ferrous sulfate. The insoluble portion of the anode slime after washing is removed to another tank preferably, which may also be lined with lead, and extracted with a solution containing hydrofluoric acid to remove the basic antimony compounds or antimony oxid, after which treatment the slime is sufficiently purified to be worked up by fusion or other usual methods. The reduced iron-sulfate solution containing silver sulfate is agitated several hours in contact with metallic copper, whereby the silver may be completely separated as metal.

From the reactions given above it will be observed that free acid is formed in the solution by action on arsenic, antimony, and bismuth and also that oxygen is removed from the solution by the same metals. In order to make electrolytic regeneration cyclic, it is necessary to neutralize this sulfuric acid and to introduce oxygen. Both of these I do by adding copper oxid to the solution or by allowing oxygen to react on metallic copper in contact with the solution.

Instead of copper oxid I can use roasted copper matte, and in this case I add the material to the solution when the iron is in the ferric state—that is, when the solution has been electrolytically or otherwise reoxidized and before it has been reduced by action on slime—as the acidity of the solution is then less, and less iron is dissolved from the matte, and the ferric sulfate assists the solution of any cuprous oxid present.

It is an advantage to have the acidity of the solution as low as possible when roasted matte is used.

If copper and oxygen are supplied to the solution by the oxidation process, using metallic copper, the best way is to allow the solution to trickle over scrap-copper in the presence of air, as in the well-known process used for making copper sulfate from copper and sulfuric acid.

The reduced solution containing all or nearly all of the iron as ferrous sulfate is passed first through the cathode-compartments of an electrolytic cell with copper cathodes, whereby copper is removed from the solution, and then through the anode-compartments with carbon anodes, whereby the ferrous sulfate is largely converted into ferric sulfate. The arsenic of the slime accumulates in the solution and is kept from reaching too great a concentration by either withdrawing a part of the solution at a convenient stage of the process and cooling it to crystallize out the arsenious acid or by removing it by well-known chemical methods, or the entire solution can be purified occasionally.

I am not limited to electrolysis to reoxidize the oxidizing agent. For instance, I can use nitric acid to regenerate the oxidizing compound. In this case I prevent the too great accumulation of copper and arsenic in the solution by crystallizing them out as copper salt and arsenious acid. Nor am I limited to iron as the carrier of oxygen from the oxidizing-tank to the slime-treatment tank. For instance, I can use chromium or manganese compounds in the form of permanganic or chromic acids, respectively, reduced by action on the metals of the slime to manganese salts and trivalent chromium salts and which can be reoxidized in different ways, as by electrolysis or reaction with lead peroxid, or I can use as oxidizing agent persulfates produced electrolytically.

I can simultaneously perform the reoxidation of a part of the reduced compound and the reduction of another part from its oxidized condition by action on the metals of the slime in the same solution, of which the following is an example: I may use a solution of an acid forming a readily-soluble salt of lead, as fluosilicic acid, in the presence of compounds of such metals as iron, chromium, or manganese. Ferric salt is reduced to ferrous salt, chromic acid to chromic salt, or permanganic acid to manganous salt, respectively, by action on the metals of the slime. At the same time the ferrous salt present is being oxidized to ferric salt, the chromic salt to chromic acid, or manganous salt to permanganic acid by reaction with the acid in solution and lead peroxid, which is added. Considering the behavior of copper in the slime, for example, the equations representing the regeneration of the oxidizing agent are

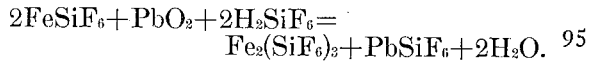
$$2FeSiF_6 + PbO_2 + 2H_2SiF_6 = Fe_2(SiF_6)_3 + PbSiF_6 + 2H_2O.$$

$$Cr_2(SiF_6)_3 + 3PbO_2 = 2CrO_3 + 3PbSiF_6.$$

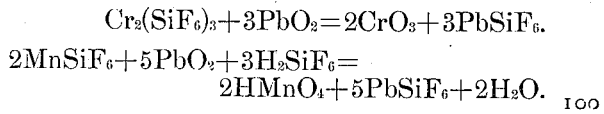
$$2MnSiF_6 + 5PbO_2 + 3H_2SiF_6 = 2HMnO_4 + 5PbSiF_6 + 2H_2O.$$

The equations representing the solution of copper are $$Cu + Fe_2(SiF_6)_3 = CuSiF_6 + 2FeSiF_6.$$

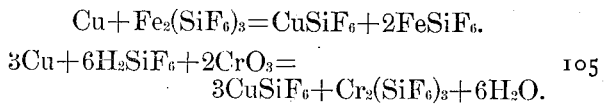
$$3Cu + 6H_2SiF_6 + 2CrO_3 = 3CuSiF_6 + Cr_2(SiF_6)_3 + 6H_2O.$$

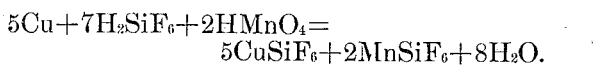
$$5Cu + 7H_2SiF_6 + 2HMnO_4 = 5CuSiF_6 + 2MnSiF_6 + 8H_2O.$$

Only a small amount of the oxygen-carrier need be present. The resulting solution of lead salts and salts of metals of the slimes can be treated for precipitation of the silver by metallic copper, the copper, arsenic, antimony, &c., by precipitation with metallic lead. The resulting solution of lead salt can now be electrolyzed with a lead cathode for the deposition of lead thereon and with an insoluble anode of carbon for the deposition of lead peroxid. The lead peroxid and the acid set free during electrolysis can be used for the treatment of a fresh quantity of slime.

When using electrolysis to reoxidize the compound reduced in attacking the slime, I am not limited to the use of a sulfate solution.

Obviously I can electrolyze a solution of iron and lead fluosilicates, or iron and lead salts of other acids forming readily-soluble lead and iron salts, depositing lead on a cathode and oxidizing ferrous salt to ferric salt at the anode, which ferric salt is then applied to the slime for the solution of silver, copper, arsenic, bismuth, &c. From the solution silver can be precipitated by metallic copper and the other metals dissolved, as well as the copper dissolved in precipitating silver by precipitation with metallic lead, after which precipitation the solution is brought back to the condition of containing iron and lead fluosilicates.

I am not limited to the use of hydrofluoric acid to dissolve the antimony from the insoluble residue left after the extraction of copper, &c. Other suitable solvents are hydrochloric acid and cream-of-tartar solution.

It is not necessary that the antimony be dissolved at all, as it can be slagged off with soda in melting, which slagging is facilitated by the antimony being in the oxidized condition.

In carrying out my process I use such reagents as oxidizing agents—ferric salts, for instance—which will not dissolve gold, even if the oxidizing agent is present in excess, or in case an oxidizing agent sufficiently strong to dissolve gold is used I take care that it is not present in sufficient quantity to dissolve gold.

The process of electrodepositing antimony herein disclosed is made the subject of another application, Serial No. 208,945, filed by me May 20, 1904, in which it is broadly claimed.

What I claim as new, and desire to secure by Letters Patent, is—

1. The process of treating anode slimes from the electrolytic refining of lead which consists in treatment with a solution having a solvent power on some of the metals of the slime, when oxidized, and with an oxidizing compound, all the elements of which, when reduced, remain in solution with the exception of a portion which may combine to form insoluble solid compounds, separating the solution from the insoluble material, and reoxidizing the compound which has been reduced to its original condition of oxidation.

2. The process of treating anode slimes from the electrolytic refining of lead which consists in treatment with a compound of a metal in a higher state of oxidation as oxidizing agent, separating the solution from the insoluble material, and reoxidizing the reduced metal to its original state of oxidation.

3. The process of treating anode slime from the electrolytic refining of lead which consists in treatment with a solution of a peroxidized metallic salt as oxidizing agent, separating the solution from the insoluble material, and reoxidizing the metal to its original state of oxidation.

4. The process of treating anode slime from the electrolytic refining of lead which consists in treatment with a solution of ferric salt as oxidizing agent, separating the solution from the insoluble material, and reoxidizing the ferrous salt produced to the ferric state.

5. The process of treating anode slime from the electrolytic refining of lead which consists in treatment with a solution of a ferric salt as oxidizing agent, separating the solution from the insoluble material, and reoxidizing the ferrous salt produced to the ferric state by electrolysis.

6. The process of treating anode slime from the electrolytic refining of lead which consists in treatment with a solution of a ferric salt as oxidizing agent, separating the solution from the insoluble material, and reoxidizing the ferrous salt produced to the ferric state by electrolysis with the simultaneous deposition of a metal on the cathode.

7. The process of treating anode slime from the electrolytic refining of lead which consists in treatment with a solution of a ferric salt as oxidizing agent, separating the solution from the insoluble material, and reoxidizing the ferrous salt produced to the ferric state by electrolysis, with the simultaneous deposition of a metal of the slime on the cathode.

8. The process of treating anode slime from the electrolytic refining of lead which consists in treatment with a solution of ferric sulfate as oxidizing agent, separating the solution from the insoluble material, and reoxidizing the ferrous sulfate produced to the ferric state, with the simultaneous deposition of copper on the cathode.

9. The cyclic process of treating anode slime from the electrolytic refining of lead which consists in treatment with a solution of ferric sulfate as oxidizing agent, separating the solution from the insoluble material, and converting the ferrous sulfate produced to ferric sulfate.

10. The process of treating anode slime from the electrolytic refining of lead which consists in treatment with a sulfate solution of a peroxidized metallic compound, separating the solution from the insoluble material and converting the reduced metallic compound to its original condition by electrolysis.

11. The cyclic process of treating anode slime from the electrolytic refining of lead which consists in treatment with a sulfate solution of a peroxidized metallic compound, separating the solution from the insoluble material, and electrolytically converting the reduced metallic compound to its original condition of oxidation, with the simultaneous deposition of copper on the cathode.

12. The process of treating anode slime from the electrolytic refining of lead which consists in treatment with a solution of peroxidized metallic compounds, separating the solution from the insoluble material, precipitating silver from the solution, and reoxidizing the reduced metallic compound to its original state of oxidation.

13. The process of treating anode slimes from the electrolytic refining of lead, which consists in treatment with a solution of an oxidizing compound, none of the elements of which, when the compound is reduced, are lost as gases, separating the solution from the insoluble material, precipitating silver from the solution, and reoxidizing the reduced compound to its original condition of oxidation.

14. The process of treating anode slimes from the electrolytic refining of lead which consists in treatment with a peroxidized metallic compound, separating the solution from the insoluble material containing all the gold of the slime, precipitating the silver from the solution as metal by means of metallic copper and reoxidizing the reduced metallic compound.

15. The process of treating anode slimes from the electrolytic refining of lead, which consists in treatment with a sulfate solution of an oxidizing compound, separating the solution from the insoluble material, precipitating silver from the solution by means of metallic copper, and reoxidizing the reduced compound.

16. The process of treating anode slimes from the electrolytic refining of lead which consists in treatment with a solution of ferric sulfate, precipitating silver from the solution by means of metallic copper, and reoxidizing the ferrous sulfate produced to ferric sulfate.

17. The process of treating anode slimes from the electrolytic refining of lead which consists in treatment with a solution of ferric sulfate, precipitating silver from the solution by means of metallic copper, electrolyzing the solution containing cupric and ferrous sulfates with an insoluble anode for the production of ferric sulfate with the simultaneous deposition of copper on the cathode.

18. The process of treating anode slimes which consists in treatment with ferric-sulfate solution, and precipitating any silver in the solution by means of metallic copper; dissolving further quantities of copper in the solution; electrolyzing the solution with insoluble anodes for the simultaneous deposition of metallic copper and the production of ferric-sulfate solution; and in extracting antimony from the insoluble material left by the iron-sulfate solution with solution containing hydrofluoric acid, and removing antimony therefrom by means of electrolysis with an insoluble anode.

19. The process of treating anode slimes which consists in treatment with a solution of ferric sulfate, and separating the solution from the insoluble material; dissolving copper in the solution; electrolyzing the solution with insoluble anodes for the simultaneous production of ferric-sulfate solution and deposition of copper: and in the operation of extracting antimony from the material undissolved by the ferric-sulfate solution, by treatment with a solution containing hydrofluoric acid, and removing antimony therefrom by electrolysis with an insoluble anode.

20. The process of treating anode slimes which consists in treatment with a solution of ferric sulfate, separating the solution from the insoluble material; reducing the proportion of arsenic in the solution by suitable means; dissolving copper in the solution; and electrolyzing the solution with an insoluble anode for the production of ferric-sulfate solution and deposition of metallic copper on the cathode: and in the operation of extracting antimony from the undissolved material by means of solutions containing hydrofluoric acid.

21. The process of treating anode slimes which consists in treatment with a ferric-sulfate solution, and separating the solution from the insoluble material; dissolving copper in the solution; electrolyzing the solution with an insoluble anode for the production of ferric-sulfate solution and the deposition of copper on the cathode: and in extracting antimony from the undissolved material by means of a solution having a solvent action on basic antimony compounds.

22. The process of treating anode slimes from the electrolytic refining of lead which consists in treatment with a solution of ferric sulfate, and separating the solution from the undissolved material, and reoxidizing the ferrous sulfate produced to ferric sulfate; and in extracting basic antimony compounds from the undissolved material by means of a suitable solvent.

23. The process of treating anode slimes from the electrolytic refining of lead which consists in treating it with peroxidized metallic compounds in solution in a liquid which does not dissolve large quantities of antimony basic compounds, and separating the solution from the undissolved material, and reoxidizing the reduced metallic compound by electrolysis; and extracting basic antimony compounds from the undissolved material by means of a suitable solvent.

24. The process of treating anode slimes from the electrolytic refining of lead which consists in treatment with an oxidizing agent in solution containing an acid which does not dissolve large quantities of basic antimony compounds, and separating the solution from the undissolved material; and in extracting basic antimony compounds from the undissolved material by means of a suitable solvent.

In testimony whereof I have signed my name to this specification in the presence of two subscribing witnesses.

ANSON GARDNER BETTS.

Witnesses:
EDWARD F. KERN,
WILLIAM VALENTINE.